3,178,398
PRODUCTION AND CURING OF POLYMERS CONTAINING TERMINALLY REACTIVE NITROGEN
Charles W. Strobel and Robert P. Zelinski, Bartlesville, Okla., assignors to Phillips Petroleum Company, a corporation of Delaware
No Drawing. Filed Oct. 24, 1960, Ser. No. 64,275
19 Claims. (Cl. 260—85.1)

This invention relates to a method of preparing a polymer having terminal groups containing reactive nitrogen and to the curing of such polymer to produce a product having either a linear or crosslinked structure. In another aspect, this invention relates to the polymeric products thus produced.

It has been disclosed in copending application, Serial No. 772,167, of Uraneck, Short, Hsieh and Zelinski, filed November 6, 1958, now Patent Number 3,135,716, that highly useful polymeric products can be obtained by polymerizing vinylidene-containing monomers in the presence of an organo alkali metal catalyst and subsequently reacting the resulting polymer containing active alkali metal end groups with a reagent which will couple the polymer molecules or replace the alkali metal atoms with more stable reactive end groups. The utilization of these reactive terminal substituents on the polymer molecule enables substantially more effective cures since all the molecules can be tied into a crosslinked structure. Also, by simple coupling arrangements alone or with auxiliary curing, liquid polymers can be readily converted to solids and soft tacky rubber can be made quite rigid.

The term "telechelic" has been coined to define terminally reactive polymers which contain a reactive group on two or more ends of the polymer molecule. As used in this specification and in the claims, telechelic polymers means polymers of vinylidene-containing monomers which contain a reactive group on each end of the polymer molecule. The term "semi-telechelic" can be used to designate those polymers which contain a reactive group on only one end of the polymer molecule. When referring to terminally reactive polymers, it is intended that both telechelic and semi-telechelic polymers be included.

According to our invention, a process is provided for preparing polymer which comprises reacting a polymer of a vinylidene-containing monomer, said polymer containing at least 1 terminally positioned alkali metal atom per molecule, with a non-polymerizable compound containing the structure

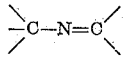

After removing the alkali metal atoms from the resulting polymer, this polymer can be coupled and/or cured by treatment of the reactive terminal groups with a polyhalogen-containing compound and crosslinked at intervals along the polymer chain with conventional curatives. Our invention, therefore, provides a method of converting liquid polymers to solid products and solids to higher molecular weight materials. The polymer containing the terminally positioned alkali metal atom can be prepared by polymerizing vinylidene-containing monomer in the presence of an organoalkali metal initiator such as, for example, a compound $R(Li)_x$ where $x$ is 1 to 4 and R is an aliphatic, cycloaliphatic or aromatic radical of 1 to 20 carbon atoms.

According to another aspect of our invention, a polymer containing a terminally reactive alkali metal atom is reacted with a compound containing at least 2 of the groups

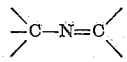

The resulting polymer can then react with still another polymer containing a terminally positioned alkali metal atom to produce a coupling arrangement in which the molecular weight of the polymer is substantially doubled without entering into any crosslinking. This product can then be cured with a polyhalogen-containing compound by reacting such compound with the reactive nitrogen positioned either at the ends of the polymer molecule or at the points of coupling.

It is an object of our invention to provide a method of preparing polymers which contain terminally reactive nitrogen. It is another object of our invention to provide a method of preparing and curing polymers which contain terminally reactive nitrogen to produce a product which has either a linear or crosslinked structure. Another object is to provide a method of coupling polymers containing terminally reactive alkali metal atoms to produce a product which has reactive nitrogen at the points of coupling which can subsequently be linked to other polymer molecules through halogen-containing compounds. Another object of our invention is to produce a polymer which contains terminally reactive nitrogen, said polymer being curable with polyhalogen-containing compounds and, further, to produce a compounded polymeric product which has been cured both with conventional curatives and with polyhalogen-containing compounds. Other objects, advantages and features of our invention will be apparent to those skilled in the art from the following discussion.

The monomers which can be employed in the preparation of polymers containing terminal alkali metals include conjugated dienes and vinyl-substituted aromatic compounds. The preferred monomers are the conjugated dienes containing from 4 to 12 carbon atoms and preferably 4 to 8 carbon atoms per molecule. The conjugated dienes include 1,3-butadiene,
isoprene,
2,3-dimethyl-1,3-butadiene,
1,3-pentadiene (piperylene),
2-methyl-3-ethyl-1,3-butadiene,
3-methyl-1,3-pentadiene,
2-methyl-3-ethyl-1,3-pentadiene,
2-ethyl-1,3-pentadiene,
1,3-hexadiene,
2-methyl-1,3-hexadiene,
1,3-heptadiene,
3-methyl-1,3-heptadiene,
1,3-octadiene,
3-butyl-1,3-octadiene,
3,4-dimethyl-1,3-hexadiene,
3-n-propyl-1,3-pentadiene,
4,5-diethyl-1,3-octadiene,
phenyl-1,3-butadiene,
2,3-diethyl-1,3-butadiene,
2,3-di-n-propyl-1,3-butadiene,
2-methyl-3-isopropyl-1,3-butadiene, and the like. Conjugated dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers or block copolymers. Block copolymers can be prepared from two or more conjugated dienes by charging one compound initially, allowing it to polymerize, and then adding a second conjugated diene, etc.

The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these include:

3-methylstyrene (3-vinyltoluene),
3,5-diethylstyrene,
4-n-propylstyrene,
2,4,6-trimethylstyrene,
4-dodecylstyrene,
3-methyl-5-n-hexylstyrene,
4-cycloehxylstyrene,
4-phenylstyrene,
2-ethyl-4-benzylstyrene,
4-p-tolylstyrene,
3,5-diphenylstyrene,
2,4,6-tri-tert-butylstyrene,
2,3,4,5-tetramethylstyrene,
4-(4-phenyl-n-butyl)styrene,
3-(4-n-hexylphenyl)styrene,
4-methoxystyrene,
3,5-diphenoxystyrene,
3-decoxystyrene,
2,6-dimethyl-4-hexoxystyrene,
4-dimethylaminostyrene,
3,5-diethylaminostyrene,
4-methoxy-6-di-n-propylaminostyrene,
4,5-dimethyl-1-vinylnaphthalene.
3-ethyl-1-vinylnaphthalene,
6-isopropyl-1-vinylnaphthalene,
2,4-diisopropyl-1-vinyl-naphthalene,
3,6-di-p-tolyl-1-vinylnaphthalene,
6-cyclohexyl-1-vinyl-naphthalene,
4,5-diethyl-8-octyl-1-vinylnaphthalene,
3,4,5,6-tetramethyl-1-vinylnaphthalene,
3,6-di-n-hexyl-1-vinylnaphthalene,
8-phenyl-1-vinylnaphthalene,
5-(2,4,6-tri-methylphenyl)-1-vinylnaphthalene,
3,6-diethyl-2-vinylnaphthalene,
7-dodecyl-2-vinylnaphthalene,
4-n-propyl-5-n-butyl-2-vinylnaphthalene,
6-benzyl-2-vinylnaphthalene,
3-methyl-5-6-diethyl-8-n-propyl-2-vinylnaphthalene,
4-o-tolyl-2-vinylnaphthalene,
5-(3-phenyl-n-propyl)-2-vinylnaphthalene,
4-methoxy-1-vinylnaphthalene,
6-phenoxy-1-vinylnaphthalene,
3,6-dimethylamino-1-vinyl-naphthalene,
7-dihexoxy-2-vinylnaphthalene, and the like.

The vinyl-substituted aromatic compounds can be polymerized alone, in admixture or with conjugated dienes to form homopolymers, random copolymers or block copolymers. The presence of a small amount of polar compound such as an aliphatic ether encourages random copolymerization between vinyl-substituted aromatic compounds and conjugated dienes.

In general, the block copolymers can include combinations of homopolymers and copolymers of the materials hereinbefore set forth. A detailed description of block copolymers containing terminal reactive groups and their method of preparation is set forth in the copending application of R. P. Zelinski, Serial No. 796,277, filed March 2, 1959, now abandoned.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally to at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $AY_n$ where A comprises the polymer as previously described, Y is an alkali metal and n is an integer of 1 to 4. The general reaction can be illustrated graphically as follows:

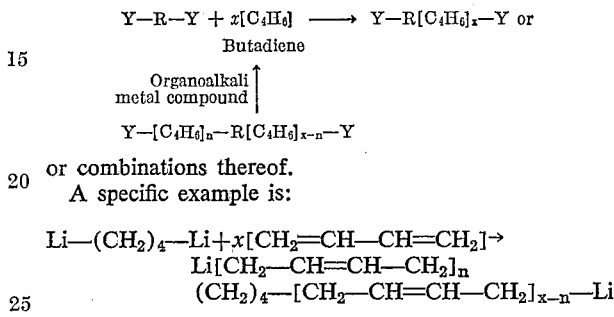

or combinations thereof.

A specific example is:

Li—$(CH_2)_4$—Li + $x$[$CH_2$=CH—CH=$CH_2$] →
  Li[$CH_2$—CH=CH—$CH_2$]$_n$
  $(CH_2)_4$—[$CH_2$—CH=CH—$CH_2$]$_{x-n}$—Li

In the specific example 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of mono-terminally reactive ploymer, that is, polymer having alkali metal at only one end of the chain is substantially higher. The alkali metals, of course, include sodium, potassium, lithium, rubidium, and cesium. The organic radical of the organo alkali metal compound can be an aliphatic, cycloaliphatic or amomatic radical. For example, mono- and polyalkali metal subsituted hydrocarbons can be employed including methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,6-dilithiohexane, 1,10 - dilithiodecane, 1,15-dipotassiopentadecane, 1,20-dilithioeicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1,1-diphenylethane, 1,2-disodio-1,2,3-triphenylpropane, 1,2-dilithio-1,2-diphenylethane, 1,2-dipotassiotriphenylethane, 1,2-dilithiotetraphenylethane, 1,2-dilithio-1-phenyl-1-naphthylethane, 1,2 - dilithio-1,2-dinapththylethane, 1,2 - disodio-1,1-diphenyl-2-naphthylethane, 1,2-dilithiotrinaphthylethane, 1,4 - dilithiocyclohexane, 2,4-disodioethylcyclohexane, 3,5 - dipotassio-n-butylcyclohexane, 1,3,5-trilithiocyclohexane, 1-lithio-4(2-lithiomethylpehnyl) butane, 1,2 - dipotassio-3-phenylpropane, 1,2-di(lithiobutyl)benzene, 1,3-dilithio-4-ethylbenzene, 1,4-dirubidiobutane, 1,8-dicesiooctane, 1,5,12-trilithiododecane, 1,4,7-trisodioheptane, 1,4-di(1,2-dilithio-2-phenylethyl)benzene, 1,2,7,8-tetrasodionaphthalene, 1,-4,7,10-tetrapotassiodecane, 1,5-dilithio-3-pentyne, 1,8-disodio-5-octyne, 1,7-dipotassio-4-heptyne, 1,10-dicesio-4-decyne, 1,11-dirubidio-5-hendecyne, 1,2 - disodio-1,2-diphenylethane, dilithiophenanthrene, 1,2-dilithiotriphenylethane, 1,2-disodio-1,2-diphenylethane, dilithiomethane, 1,4 - dilithio-1,1,4,4-tetraphenylbutane, 1,4-dilithio-1,4-diphenyl-1,4-dinaphthylbutane, dilithium adducts of 2,3-dialkyl-1,3-butadiene such as dilithium adducts of 2,3-dimethyl-1,3-butadiene containing from 1 to 7 2,3-dimethyl-2,3-dimethyl-1,3-butadiene units, and the like.

While the organo alkali metal initiators in general can be employed, the organo dilithium initiators are much to be preferred. For example, condensed ring oramtic compounds such as lithium-anthracene adduct is a good initiator as are the adducts of lithium with naphthalene and biphenyl. One of the preferred initiators is the lithium adduct of 1,2-diphenylethylene. Also, highly preferred are the dilithium adducts of butadiene, isoprene or 2,3-dialkyl-1,3-butadienes described above. These adducts ordinarily contain up to 10 diene units per molecule and preferably 1 to 5 units. The organo dilithium compounds are most effective in promoting the formation of terminally reactive polymers which are useful in our invention.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between −100 and +150° C., preferably between −75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures.

The polymer resulting from the process as described above will contain 1 or more terminal alkali metal atoms, preferably lithium atoms, depending upon the initiator employed. The unquenched polymerization mixture is then treated with a compound containing the structure

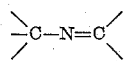

to give a product which has terminal groups containing reactive nitrogen. These compounds should be non-polymerizable under the process conditions and also free of substituents which are not inert to the nitrogen and the alkali metal of the reacting materials. The compounds which are suitable for reacting with the terminally reactive alkali metal atoms include heterocyclic nitrogen compounds in which the carbon atoms in the alpha and gamma positions with respect to nitrogen contain substituents selected from the group consisting of hydrogen, tertiary alkyl, aryl, alkoxy, aryloxy, and dialkylamino groups while the carbon atoms in all the other positions contain substituents selected from the group consisting of hydrogen, alkyl, alkoxy, aryloxy, cycloalkyl, aryl, aralkyl, alkaryl, and dialkylamino groups and the beta carbons can also contain vinylidene substituents. Preferably the heterocyclic nitrogen campound does not contain more than 9 ring carbon atoms and the total number of carbon atoms in the substituents should not exceed 12. Examples of a number of such suitable heterocyclic nitrogen compounds include pyridine, 3-methylpyridine, 3,5-dimethylpyridine, 2-tert-butylpyridine, 2,5-di-tert-butylpyridine, 3-dodecylpyridine, 2,6-dimethoxypyridine, 4-phenoxypyridine, 2-methoxy-5-propylpyridine, 3,5-dihexylpyridine, 3-butyl-5-octylpyridine, 2,2′-bipyridine, 2,3′-bipyridine, 3,3′-bipyridine, 4,4′-bipyridine, quinoline, 3-methylquinoline, 2-tert-octylquinoline, 4-nonoxyquinoline, 3,6-diisopropylquinoline, 3,5,8-tri-n-butylquinoline, isoquinoline, 1-pentoxyisoquinoline, 3-tert-decylisoquinoline, 3-decoxyisoquinoline, 4,5-diethylisoquinoline, 1,8-naphthyridine, 1,5-naphthyridine, 1,6-naphthyridine, 1,7-naphthyridine, 2,7-naphthyridine, 3,6-di-n-hexyl-1,8-naphthyridine, 2,7-dimethoxy - 1,8-naphthyridine, quinazoline, 1,3,2-benzoxazine, 1,4,2-benzoxazine, 3,1,4-benzoxazine, 2-pyrrolenine, 3-pyrrolenine, 2-isoimidazole, oxazole, thiazole, 1,2,4-dioxazole, indolenine (3-pseudoindole), 2-isobenzazole (pseudoisoindole), pyrimidine (1,3-diazine), 1,5-pyridine, 1,3,5-triazine, benzoxazole, purine, and the like. Other suitable compounds are the N-substituted imines including both the mono- and diimines. Illustrative of these compounds are: N-ethylethylidenimine (N-ethylidenethylamine), N-methylbenzylidenimine (N-benzylidenemethylamine), N-hexylcinnamylidenimine, N-decyl-2-ethyl-1,2-diphenylbutylidenimine, N-phenylbenzylidenimine (N-benzylidenaniline), N-dodecylcyclohexanimine, N-propyl-2,5-cyclohexadienimine, N-methyl - 1 - naphthalenimine, N,N′-dimethylbutanediimine, N,N′-dipentyl-2-pentene-1,5-diimine, N-nonyl-1,4-naphthoquinonimine, N,N′-diphenyl-1,4-quinonediimine, N,N′-diphenyl-1,3-indandiimine, and the like. Also suitable are the carbodiimides such as N,N′-dimethylcarbodiimide, N,N′ - diethylcarbodiimide, N,N′-diisopropylcarbodiimide, N,N′-di-tert-butylcarbodiimide, N,N′-di-n-hexylcarbodiimide, N,N′-dioctylcarbodiimide, N,N′-didecylcarbodiimide, N,N′-methylethylcarbodiimide, N,N′-ethylheptylcarbodiimide, N,N′-dicyclopentylcarbodiimide, N,N′-dicyclohexylcarbodiimide, N,N′-diphenylcarbodiimide, N,N′ - di - 2 - naphthylcarbodiimide, N,N′-di-4-tolylcarbodiimide, N,N′-dibenzylcarbodiimide, N,N′-nonyleicosylcarbodiimide, and the like. Since it is the

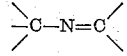

structure that is important in the reaction with the terminally reactive alkali metal atoms, it can be seen that the substituents on the nitrogen of the imines or diimines, or on the organic radical to which both nitrogens are joined in the diimines and such substituents on the carbodiimides can vary considerably as illustrated and, therefore, a large number of suitable compounds will be readily apparent to those skilled in the art. It is preferred that these imines and carbodiimides contain not more than 30 carbon atoms per molecule. The nitrogen substituents are preferably alkyl, cycloalkyl or aryl groups which can in turn be substituted with alkoxy, or aryloxy or dialkylamino groups. As pointed out above, these compounds should not contain a

group nor should they contain reactive substituents.

As pointed out previously and as illustrated in the compounds presented above, the structure

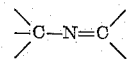

can occur more than once in a compound. For example, in 1,3,5-triazine, the structure occurs 3 times in a 6-membered ring. When only 1 of these functional groups is present, the compound reacts with a single alkali metal atom and replaces this alkali metal atom with the reactive end group containing the nitrogen. When 2 or more of these functional groups are present, the reagent also serves as coupling and/or curing agent by reacting with the alkali metal atoms on more than 1 polymer molecule.

The type of terminal group which results from this reaction depends upon reaction conditions. For example, if the unquenched polymerization mixture in which the polymer contains terminally reactive lithium atoms is reacted with pyridine, the resulting polymer contains either 2-pyridyl or 1,2-dihydro-2-pyridyl terminal groups or a mixture of these groups depending upon both time and temperature under which the reaction is carried out. Higher temperatures tend to yield the 2-pyridyl groups while the dihydro form is obtained at lower temperatures. In general, the temperature of the reaction can vary from −40 to 150° C. Although the polymer containing 1,2-dihydro-2-pyridyl terminal groups tends to be produced at temperatures in the range below 50° C., this temperature can be somewhat higher if the reaction time is short. For example, at 50° C., a product can be prepared which contains predominantly dihydropyridyl groups if the reaction time is not longer than about 5 to 10 minutes. With an even shorter reaction time, somewhat higher temperatures can be used to obtain the same product. The temperature range which is preferred for polymers containing the dihydropyridyl terminal groups is 0 to 35° C. When it is desired to prepare polymers containing 2-pyridyl terminal groups, the temperature generally should be above 50° C. The time for the reaction can range from 5 minutes to 25 hours or longer, depending upon the type of product desired. Analogous reactions occur when other compounds containing the structures —C—N=C are employed in place of the pyridine.

In the above-described reaction, the alkali metal-terminated polymer adds across nitrogen-carbon double bond. The immediate product is, therefore, one in which lithium, for example, is attached to the nitrogen while the polymer is attached to the carbon. At the higher temperatures, lithium hydride is produced as a by-product and the double bond between the nitrogen and the carbon to which the polymer is attached is restored to produce the 2-pyridyl group when pyridine is employed as the nitrogen-containing reagent. At the lower temperatures, the lithium atoms remain attached to the nitrogen and can be removed by reacting the polymer with a reagent which is capable of replacing the alkali metals with hydrogen. This, is the same quenching reaction which is frequently used to inactivate the alkali metal initiator at the end of the polymerization. Usually, the quenching reagent is water, an acid or an alcohol. For example, isopropyl alcohol can be employed to replace terminal lithium atoms with hydrogen. The resulting polymer contains, as described above, the 1,2-dihydro-2-pyridyl groups.

When a bi-functional compound such as bipyridine or naphthyridine is employed, each nitrogen to carbon double bond can participate in the reaction. Where coupling occurs between lithium-telechelic polymers, the resulting product has reactive terminal nitrogen atoms as well as reactive nitrogen spaced along the polymer chain at the sites of coupling. When organomonolithium initiator is employed, such as n-butyllithium, and the polymer is treated with pyridine, the product contains only one terminal reactive group. When the polymer is treated with 2,2′-bipyridine, for example, a simple coupling reaction occurs and yields a product having a molecular weight approximately twice that of the original polymer. In this case, polymer containing terminally reactive nitrogen is an intermediate in the reaction and the recovered polymer contains reactive nitrogen at the points of coupling rather than positioned terminally on the polymer molecule. In the polymers which are formed with the compounds containing more than one

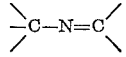

group as well as those containing only one such group, the presence of tertiary or secondary nitrogen

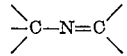

(that is, C—N=C or C—N—C groups)

in the end product depends upon the temperature of the reaction as described above.

The amount of the compound containing the

>C—N=C< group employed is the reaction is at least that which will react with all of the alkali metal atoms in the polymer and it is preferred that an excess of this compound be used. If the nitrogen-containing compound has only one functional group, such as is present in pyridine, quinoline or isoquinoline, the quantity employed is generally in the range from 1 to 25 moles per gram atom of lithium, with 1 to 10 moles per gram atom of lithium or other alkali metal being preferred. When this nitrogen-containing compound has two or more functional groups, the quantity of the reactant employed is adjusted to conform on a stoichiometric basis with the ratios given for those compounds containing only one such functional group.

The resulting polymers containing the terminally reactive nitrogen or reactive nitrogen at the point of coupling can be coupled and/or cured with polyhalogen-containing compounds of the type which is normally employed as a quaternizing agent for heterocyclic nitrogen-containing compounds and their polymers, such as polymers of 2-vinylpyridine. These polyhalogen-containing compounds should not contain more than 3 halogen atoms joined to a carbon atom. Examples of suitable compounds of this nature are benzotrichloride, bis(trichloromethyl)benzene, 1,10-dibromodecane,α,α′-dichloroparaxylene, hexachloroparaxylene, 1,2-dibromoethane, 1,2-diiodoethane, 1,2-dichloropropane, 1,2-dibromobutane, 1,2-dibromooctane, 1,3-diiodopropane, 1,2-dibromobutane, 1,3-diiodohexane, 1, 3,5-trichloropentane, 1,3,4,6-tetrabromohexane, 1,2,7,8-tetraiodooctane, bromoform, chloroform, iodoform, hexachlorocyclopentadiene, organophosphonic dihalides and organothiophosphonic dihalides containing up to 20 carbon atoms per molecule such as methylphosphonic dichloride, chloromethylphosphonic dichloride, 2-bromoethylphosphonic dichloride, dodecylphosphonic dichloride, methylthiophosphonic, dichloride, 3-methylphenylthiophosphonic dichloride, bis(chloromethyl) ether, bis(1-bromoethyl) ether, 1,3-dichloro-2-propanone, 1,5-dichloro-2, 4 - pentane-dione, 1,4-bis(chloromethyl)benzene, 1,4-dichloro-2-butene, bis(bromethyl) ether, methyl dichloromethyl ether, bis(1-fluoropropyl) ether, bis(iodomethyl) ether, chloromethyl 1-chloropropyl ether, bis(1-iodoamyl) ether, bis(1-chloro-decyl) ether, hexyl 1,1-dichloroheptyl ether, 1-chloro-n-butyl, 1,1-dichloro-n-butyl ether, bis(1, 1-dibromodecyl) ether, 1,1-difluoroethyl 1-fluoroheptyl ether, bis[chloro(ethoxy)methyl] ether, bis[1-bromo(2-propyl)ethyl] ether, difluoromethyl 1-fluoro(3-ethoxy) propyl ether, bis[chloro(vinyloxy)methyl] ether, bis(1-iodo-(4-vinyloxy)n-butyl] ether, 1-bromo(2-vinyloxy) ethyl, 1,1-dibromopropyl ether, bis[-1-chloro(5-vinyloxy) octyl] ether, bis[chloro(N,N - dimethylamino)methyl] ether, dibromomethyl 1-bromo-4-(N,N-dimethylamino)n-butyl ether, bis[1-iodo-6-(N,N-diethylamino)hexyl] ether, 2,2-dibromo-3-decanone, 3,5,5-trichloro-4-octanone, 2,4-dibromo - 3 - pentanone, 1-chloromethyl-4-(1-chloro-n-propyl)benzene, 1,3,5 - tri(bromomethyl)benzene, 1,4-dichloro-2 - hexene, 4,4-di-chloro-2-heptene, 1,1-dibromo-4-chloro-2-pentene and 2,5,6,9-tetrachloro-3,7-decadiene, and the like.

The polyhalogen-containing compounds are mixed with the polymer containing the reactive nitrogen with or without auxiliary curatives. In general, the conditions of curing or coupling with the polyhalogen-containing compounds are the same as those ordinarily employed in curing rubbery polymers with conventional curatives such as sulfur or peroxides. The reaction conditions will depend upon particular compounds selected and the degree of cure desired. In general, the temperature can vary from room temperature or slightly below to as high as 500° F. Ordinarily, and preferably, the temperature is in the range of about 100 to 450° F. The time of reaction can vary from a few minutes, for example 5 or 10 minutes, to several hours, for example up to 100 hours or longer.

The advantages and condition for carrying out the reactions of our invention are illustrated by the following specific examples. The conditions and reactants are presented in the examples as being typical and should not be construed to limit our invention unduly.

Example I

Butadiene was polymerized in accordance with the following recipe:

| | |
|---|---|
| 1,3-butadiene, parts by weight | 100 |
| Cyclohexane, parts by weight | 780 |
| 1,2-dilithio-1,2-diphenylethane, mmoles | 10 |
| Temperature, °C. | 50–65 |
| Time, hours | 1 |

The reaction was effected in a half-gallon reactor. Cyclohexane was charged, the reactor was purged with nitrogen, 1,2-dilithio-1,2-diphenylethane was added and then the butadiene. The 1,2-dilithio-1,2-diphenylethane was added as a 0.19 molar solution in a 9:1 by volume ether-tetrahydrofuran mixture. After a polymerization period of one hour, 30 millimoles of pyridine was introduced and the mixture was heated 78 hours at 71° C. (160° F.). The liquid polymer was recovered by coagulation with isopropanol and dried in a vacuum oven. It had an inherent viscosity of 0.32 and was gel free. Analysis by titration with perchloric acid in benzene showed that the product contained 1.38 weight percent pyridine or 17.5 millimoles of pyridine per 100 grams of polymer.

The polybutadiene containing pyridyl end groups was treated with several halogen-containing compounds, using five parts by weight of each per 100 parts polymer. Inherent viscosity and gel were obtained on each product. The following table shows the halogen-containing compound employed and the results obtained:

| Run No. | Treating agent | Treating conditions | | Inherent viscosity | Gel, percent |
|---|---|---|---|---|---|
| | | Temperature, °F. | Time, min. | | |
| 1 | α,α'-Dichloro-p-xylene | 307 | 30 | 0.81 | trace |
| 2 | α,α'-Dichloro-p-xylene | 307 | 90 | 0.26 | 48 |
| 3 | Hexachloro-p-xylene | 307 | 60 | 0.46 | 59 |
| 4 | None | | | 0.32 | 0 |

An increase in inherent viscosity in run 1 shows that coupling occurred. Alpha, alpha'-dichloroparaxylene caused crosslinking when the mixture was heated for a longer period as evidenced by the gel content of the product of run 2. The even higher gel content of run 3 indicates a greater degree of crosslinking. The inherent viscosities of runs 2 and 3 were determined on the gel-free portion of each sample.

Example II

Two runs were made for the polymerization of butadiene using the following recipe:

| | 1 | 2 |
|---|---|---|
| 1,3-butadiene, parts by weight | 100 | 100 |
| Cyclohexane, parts by weight | 780 | 780 |
| 1,2-dilithio-1,2-diphenylethane, mmoles | 3 | 6 |

Polymerization was effected at 50° C. in an atmosphere of nitrogen. After 4 hours, a 0.1 molar solution of 2,2'-bipyridine in toluene was added to each reaction mixture, 3 millimoles being used in run 1 and 6 millimoles in run 2. The reactions were continued 14 hours after the bipyridine was introduced while the temperature was maintained at 50° C. Each product was coagulated with isopropanol and dried. Inherent viscosity and gel were determined on the products before and after treatment with bipyridine. Results were as follows:

| | 1 | 2 |
|---|---|---|
| Original polymer: | | |
| Inherent viscosity | 1.10 | 0.49 |
| Gel, percent | 0 | 0 |
| Polymer after bipyridine treatment: | | |
| Millimoles bipyridine/100 g. polymer [1] | 5.82 | 12.4 |
| Inherent viscosity | 1.34 | 0.84 |
| Gel, percent | 0 | 0 |

[1] Determined by perchloric acid titration in benzene. In the perchloric acid titration, a 0.1 normal solution of perchloric acid in glacial acetic acid is prepared. Methylviolet dissolved in glacial acetic acid is used as the indicator for the titration.

Results of the perchloric acid titration show that the polymer contained basic end groups. The increase in inherent viscosity upon treatment with bipyridine is indicative of coupling.

Samples of the treated polymers from both runs were heated at 160° F. for 72 hours. Bis(chloromethyl) ether was added to other samples using one equivalent of the ether per equivalent of bipyridine. These mixtures were heated at 160° F. for 72 hours. Results of inherent viscosity and gel determinations were as follows:

| | 1 | 2 |
|---|---|---|
| Heated 160° F. for 72 hours: | | |
| Inherent viscosity | 1.46 | 0.88 |
| Gel, Percent | 3 | 5 |
| Bis(chloromethyl) ether heat: | | |
| Inherent viscosity | 1.24 | ([1]) |
| Gel, percent | 57 | 65 |

[1] Not determined because of high gel contents.

These data show that bis(chloromethyl) ether was a crosslinking agent for the 2,2'-bipyridine-treated polymers. The polymers which were only heated without the presence of the bis(chloromethyl) ether showed only slight evidence of crosslinking.

Example III

A rubbery butadiene/styrene copolymer was prepared in accordance with the following recipe:

| | |
|---|---|
| 1,3-butadiene, parts by weight | 77 |
| Styrene, parts by weight | 23 |
| Cyclohexane, parts by weight | 1170 |
| Tetrahydrofuran, parts by weight | 1.5 |
| 1,2-dilithio-1,2-diphenylethane, mmoles | Variable |

The cyclohexane was charged, the reactor was purged with nitrogen, and a 0.20 molar solution of 1,2-dilithio-1,2-diphenylethane in a 9:1 by volume mixture of ether and tetrahydrofuran was introduced. The monomers were charged last and polymerization was effected at 50° C. Two runs were made at different initiator levels. After a two-hour polymerization period, a portion of the reaction mixture from each run was withdrawn and treated with pyridine, using 3 millimoles per 100 grams of monomers. The temperature of the pyridine-containing reaction mixtures was held at 50° C. for 14 hours to allow sufficient time for the reaction to take place. All polymers were coagulated, dried, and the Mooney value (ML–4 at 212° F.) determined. Results were as follows:

| Run No. | Initiator level, mmoles | ML–4 at 212° F. | Description of polymer |
|---|---|---|---|
| 1 | 1.3 | 28.8 | Control. |
| 2 | 1.3 | 27.3 | Contained pyridyl end groups. |
| 3 | 1.2 | 49.1 | Control. |
| 4 | 1.2 | 76.0 | Contained pyridyl end groups. |

Products from runs 2 and 4 were blended and compounded in accordance with the following recipes:

| | Parts by weight | |
|---|---|---|
| | 1 | 2 |
| Polymer containing pyridyl end groups | 100 | 100 |
| Philblack O [1] | 50 | 50 |
| Dicumyl peroxide | 0.5 | 0.5 |
| α, α'-Dichloro-p-xylene | 1.0 | |
| Bis(chloromethyl) ether | | 1.0 |

[1] High abrasion furnace black.

The stocks were cured 30 minutes at 307° F. and physical properties determined. Results were as follows:

| | | |
|---|---|---|
| $V_r$ [1] | 0.441 | 0.460 |
| Tensile, p.s.i. | 2,290 | 1,945 |
| Elongation, percent | 240 | 195 |
| Shore hardness | 70 | 72 |
| ΔT, ° F | 55.5 | 57.5 |
| Resilience, percent | 73.6 | 74.0 |

[1] Volume fraction of polymer in the swollen stock determined according to a method described in Rubber World, 135, No. 1, 67–73 (1956); indicates degree of crosslinking in the polymer.

The above data show that the polymer of this invention can be cured using a peroxide and a polyhalogen compound. The invention, therefore, provides a sulfur-free system which can be used in situations where sulfur is desirable.

*Example IV*

The polymer blend from Example III was compounded in accordance with the following recipes:

| | Parts by weight | |
|---|---|---|
| | 1 | 2 |
| Polymer containing pyridyl end groups | 100 | 100 |
| Philblack O | 50 | 50 |
| Sulfur | 1.7 | 1.7 |
| Zinc oxide | 3 | 3 |
| Stearic acid | 2 | 2 |
| Flexamine [1] | 1 | 1 |
| Santocure [2] | 1 | 1 |
| Resin 731 [3] | 3 | 3 |
| α, α'-dichloro-p-xylene | 1.0 | |
| Bis(chloromethyl) ether | | 1.0 |

[1] Physical mixture containing 65 percent of a complex diarylamine-ketone reaction product and 35 percent of N,N'-diphenyl-p-phenylenediamine.
[2] N-cyclohexyl-2-benzothiazolesulfenamide.
[3] A disproportionated pale rosin stable to heat and light.

Physical properties of the stocks were determined after curing 30 minutes at 307° F. Results were as follows:

| | 1 | 2 |
|---|---|---|
| $V_r$ [1] | 0.440 | 0.432 |
| 300% Modulus, p.s.i. | 2,560 | 2,260 |
| Tensile, p.s.i. | 3,270 | 3,550 |
| Elongation, percent | 370 | 420 |
| Shore hardness | 70 | 67 |
| ΔT, ° F | 55.1 | 51.7 |
| Resilience, percent | 71.7 | 71.6 |

[1] Volume fraction of polymer in the swollen stock determined according to a method described in Rubber World, 135, No. 1, 67–73 (1956); indicates degree of crosslinking in the polymer.

The above data demonstrate that a product having a good balance of physical properties can be prepared according to our invention using a conventional sulfur-curing recipe in combination with the polyhalogen-containing curatives which react with the active nitrogen atoms of the polymer. These properties show that the products are suitable for tread stocks.

*Example V*

Butadiene was polymerized as in Example II except that variable amounts of 1,2-dilithio-1,2-diphenylethane were employed. After a 45-minute polymerization period, each reaction mixture was treated with 200 millimoles per 100 grams monomer of quinoline or isoquinoline. The mixtures were shaken vigorously and then allowed to stand for 1.5 hours after which they were quenched with a small amount of water, washed twice with water, and the polymers coagulated with isopropanol. Five-gram samples of two of the products were mixed with 1,10-dibromodecane and the compositions heated one hour at 310° F. to effect curing. The following table shows polymerization data, treatment with quinoline and isoquinoline, and curing:

| Run No. | Initiator level, mhm [1] | End group | Millimoles reactive group/100 g. polymer [2] | Inh. visc. | Gel, percent | $C_{10}Br_2$, mhm [1] | Inh. visc.[3] | Gel, percent |
|---|---|---|---|---|---|---|---|---|
| 1 | 5 | Dihydroquinolyl | 8.5 | 0.59 | 0 | 8 | 0.91 | 17 |
| 2 | 10 | do | 10.0 | 0.33 | 0 | | | |
| 3 | 5 | Dihydroisoquinolyl | 6.6 | 1.05 | 0 | 7 | 1.40 | 8 |
| 4 | 10 | do | 17.2 | 0.60 | 0 | | | |

[1] Millimoles per 100 grams monomer.
[2] Determined by perchloric acid titration in benzene.
[3] Determined on soluble portion.

The data show that reactive end groups were present in all the polymers and that curing was accomplished by treatment with 1,10-dibromodecane.

*Example VI*

Butadiene was polymerized as in Example II except that the initiator level was 30 millimoles per 100 grams of butadiene. After a 25-minute polymerization period, the reaction mixture was allowed to cool to room temperature. A sample was withdrawn, quenched, and coagulated with isopropanol (sample 1). Pyridine was added to the remainder of the reaction mixture, using 360 millimoles per 100 grams of butadiene and the temperature was increased to 50° C. Five minutes after addition of the pyridine another sample was withdrawn, quenched, and coagulated (sample 2). The remaining portion of the reaction mixture was held at a temperature of 50° C. overnight and was then quenched and coagulated (sample 3).

An infrared examination was made on each of the samples using sample 1, which had no reactive end groups, as the control. Sample 2 showed a definite band at 3 microns corresponding to —NH. This result indicates the presence of 1,2-dihydro-2-pyridyl groups in the polymer. In sample 3 there was a band at 6.20 microns corresponding to —N=C. This result indicates the presence of 2- pyridyl groups in the polymer. Sample 2 showed a weak band at 6.20 microns which indicated that some 2-pyridyl groups were present along with the dihydropyridyl groups.

*Example VII*

Butadiene was polymerized in accordance with the following recipe:

8716-46

| | |
|---|---|
| Cyclohexane, parts by weight | 780 |
| 1,3-butadiene, parts by weight | 100 |
| 1,2-dilithio-1,2-diphenylethane, mmoles | 20 |
| Temperature, °C. | 50 |
| Time, hours | 2 |
| Conversion, percent | 100 |

Immediately following polymerization samples of the polymer solution were treated with N-benzilidenaniline and N-benzylidenemethylamine, using in each case two moles of the treating agent per mole of initiator charged. The temperature was maintained at 50° C. for 14 hours after addition of the treating agent. The liquid products were recovered by coagulation with isopropanol and dried. Analysis by titration with perchloric acid in benzene gave the millimoles of base (nitrogen-containing treating agent) per 100 grams of polymer. Results of titrations as well as inherent viscosities of polymers were as follows:

| Run No. | Treating agent | Inherent viscosity | Mmoles base per 100 grams polymer |
|---|---|---|---|
| 1 | N-benzylideaniline | 0.33 | 14.4 |
| 2 | N-benzylidenemethylamine | 0.44 | 11.7 |

These results show that both reagents gave polymers which had basic end groups.

The product from the N-benzylideaniline was treated with two curing agents, bis(chloromethyl)ether and α,α'-dichloro-p-xylene. The millimole quantity of each of these reagents was equal to the millimoles of initiator charged. After curing the mixtures for 72 hours at 160° F., the following results were obtained:

| Curing agent | Inherent viscosity | Gel, percent |
|---|---|---|
| Bis(chloromethyl)ether | | 86 |
| α,α'-Dichloro-p-xylene | ¹ 0.33 | 13 |

¹ Determined on soluble portion.

These results show that both the polyhalogen compounds crosslinked the polymer.

The inherent viscosities of the above polymers were determined as follows:

One-tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of the toluene. The inherent viscosity is calculated by dividing the natural logarithm of the relative viscosity by the weight of the original sample.

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

The cage, after removal from the two-ounce bottle, was placed in an aluminum weighing dish of known weight and the cage and dish were placed in a vacuum drying oven at 70–80° C. for one hour after which they were allowed to cool to room temperature and weighed. Subtracting the sum of the weights of the aluminum dish and the cage from the latter weighing gave the weight of the gel which was finally corrected for solution retention on the cage and for soluble polymer remaining within the gel structure.

This invention provides a method whereby liquid polymers can be coupled and/or crosslinked to produce semi-solid and solid products. Such polymers are useful in adhesive compositions, potting compounds for making molded objects and as binders for solid materials. Rubbers having good properties are obtained by using a combination of curatives which will produce crosslinking along the polymer chain as well as the ends of the polymer or at points of coupling wherever the reactive nitrogen atoms are present. It will be apparent to those skilled in the art from the above disclosure that various modifications can be made in our invention without departing from the spirit or scope thereof.

We claim:

1. A process for the preparation of polymer which comprises reacting a polymer containing at least one terminally positioned alkali metal atom per molecule active for further polymerization, said polymer being a polymerizate of monomers selected from the group consisting of conjugated dienes containing from 4 to 12 carbon atoms per molecule and vinyl-substituted aromatic compounds, with a compound containing the structure

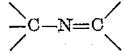

and free of vinylidene groups and reactive substituents and selected from the group consisting of heterocyclic nitrogen compounds, N-substituted imines and carbodimides, and removing any remaining alkali metal atoms from the resulting polymer.

2. The process of claim 1 wherein said reacting is carried out at a temperature below 50° C. and the resulting polymer is reacted with a material capable of replacing the alkali metal atoms with hydrogen.

3. The process of claim 1 wherein said reacting is carried out at a temperature above 50° C.

4. The process of claim 1 wherein said polymer is a polymer of 1,3-butadiene and said compound is pyridine.

5. The process of claim 19 wherein said polymer is a polymer of 1,3-butadiene, said alkali metal is lithium, and said compound is 2,2-bipyridine.

6. A process which comprises contacting a polymer of a conjugated diene having from 4 to 12 carbon atoms per molecule said polymer containing at least one terminal lithium atom per molecule, in solution prior to quenching with a nitrogen-containing compound having the structure

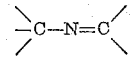

and free of vinylidene groups and reactive substituents and selected from the group consisting of heterocyclic nitrogen compounds, N-substituted imines and carbodimides, recovering from solution the resulting polymer containing reactive nitrogen atoms, and contacting the recovered polymer with a polyhalogen-containing compound having at least one hydrogen attached to a carbon atom.

7. The process of claim 8 wherein said conjugated diene is 1,3-butadiene, said nitrogen-containing compound is pyridine and said polyhalogen compound is hexachloro-p-xylene.

8. The process of claim 6 wherein said conjugated diene is 1,3-butadiene which is copolymerized with styrene, said nitrogen-containing compound is quinoline and said polyhalogen compound is 1,10-dibromodecane.

9. The process of claim 6 wherein said conjugated diene is 1,3-butadiene, said nitrogen-containing compound is bipyridine, and said polyhalogen compound is $\alpha,\alpha'$-dichloro-p-xylene.

10. The process of claim 6 wherein said conjugated diene is isoprene, said nitrogen-containing compound is N-benzylideneaniline, and said polyhalogen compound is bis(chloromethyl) ether.

11. A process which comprises contacting a polymer of 1,3-butadiene, said polymer containing at least one terminal lithium atom per molecule, in solution prior to quenching with a nitrogen-containing compound having the structure

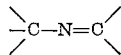

and free of vinylidene groups and reactive substituents and selected from the group consisting of heterocyclic nitrogen compounds, N-substituted imines and carbodimides at a temperature in the range of −40 to 150° C., recovering from solution the resulting polymer containing reactive nitrogen atoms, compounding said recovered polymer, and curing the resulting compounded polymer in the presence of a conventional curative and a polyhalogen-containing compound having not over 3 halogen atoms attached to a carbon atom at a temperature in the range of about 100 to 450° F.

12. The process of claim 11 wherein said nitrogen-containing compound is 1,3,5-triazine.

13. The process of claim 11 wherein said nitrogen-containing compound is isoquinoline.

14. The process of claim 11 wherein said nitrogen-containing compound is N-benzylidenemethylamine.

15. The process of claim 11 wherein said nitrogen-containing is N-ethylidenethylamine.

16. A polymer prepared by the process of claim 1.

17. A polymer prepared by the process of claim 7.

18. A polymer composition prepared by the process of claim 11.

19. The process of claim 1 wherein said compound contains at least two of said

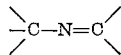

groups.

References Cited by the Examiner
UNITED STATES PATENTS

| | | | |
|---|---|---|---|
| 2,561,814 | 7/51 | Novotny | 260—94.7 |
| 2,653,934 | 9/53 | Kaiser | 260—249.6 |
| 2,975,160 | 3/61 | Zelinski | 260—83.7 |

OTHER REFERENCES

Fisher, H. L.: "Chemistry of Natural and Synthetic Rubbers," page 35, Reinhold Publishing Corp., N.Y., 1957

LEON J. BERCOVITZ, *Primary Examiner.*

M. LIEBMAN, *Examiner.*